Jan. 1, 1929.
P. M. NAGY
1,697,401
CURRENT CONTROL APPARATUS
Filed May 24, 1926
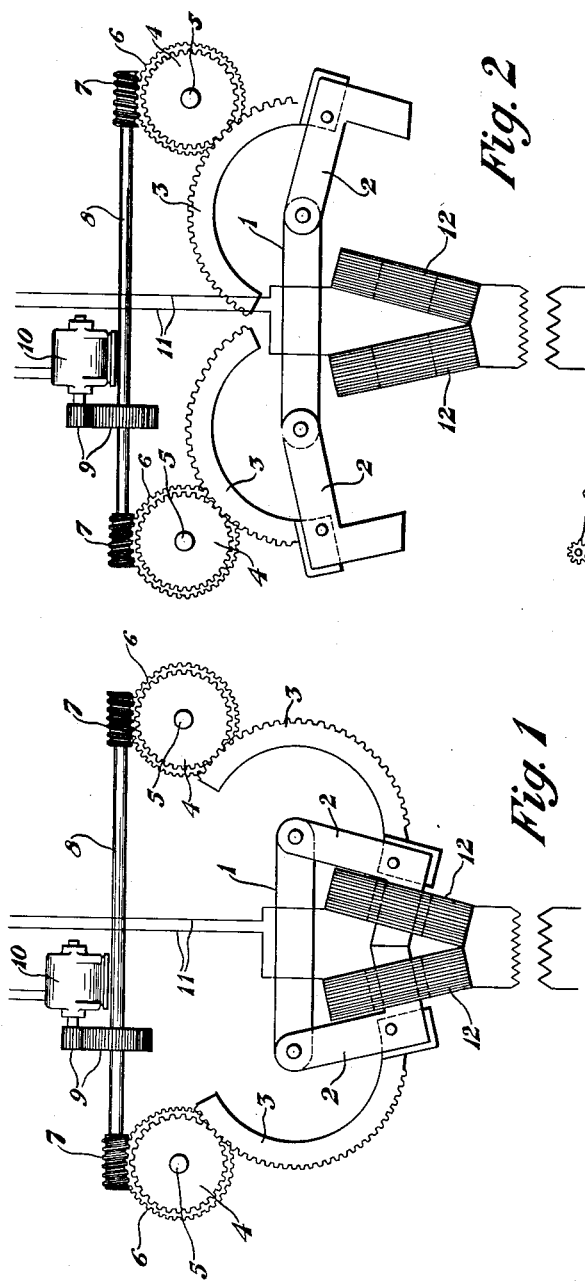
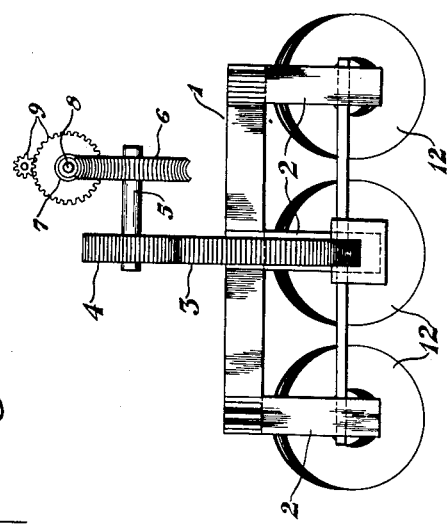
Inventor
Peter M. Nagy
By Frease and Bond
Attorneys Patented Jan. 1, 1929.

1,697,401

UNITED STATES PATENT OFFICE.

PETER M. NAGY, OF ALLIANCE, OHIO, ASSIGNOR TO THADDEUS F. BAILY, OF ALLIANCE, OHIO.

CURRENT-CONTROL APPARATUS.

Application filed May 24, 1926. Serial No. 111,392.

The invention relates to devices for controlling the current to an electric power consuming device such, for instance, as a furnace or the like.

It is well known that current controlling devices have been provided in which a primary and secondary coil are located in movable relation to each other on the common iron core and also that current controlling devices such as induction regulators are used wherein the primary and secondary coils are on separate cores and the core and winding of the one are movable with relation to the core and winding of the other. Such a construction has the disadvantage of requiring two windings and under certain conditions the fact that the iron core is always energized, while in my arrangement it will be seen that under certain conditions wherein the full current is desired the iron core may be completely withdrawn from the coil and in such position it will in nowise affect the current flowing in the circuit to be controlled.

As the open ends of the iron core approach each other the magnetic effect produced by their proximity to the coil is such as to reduce the current flowing to the current consuming device.

An embodiment of the invention is illustrated in the accompanying drawing, in which Figure 1 is a side elevation of the control apparatus showing the separable core in closed position;

Fig. 2, a similar view showing the core in open position, and

Fig. 3, an end elevation showing the apparatus designed for a multi-phase circuit.

Similar numerals refer to similar parts throughout the drawing.

The iron core is indicated generally at 1 and provided with the movable portions 2, which may be hinged as illustrated whereby the separable ends of the core may be moved into closed position as shown in Figure 1 or withdrawn to substantially the furthermost open position as shown in Fig. 2.

For the purpose of moving the sections 2, of the core, to adjust the separable ends with relation to each other, any suitable mechanism may be provided such as that illustrated, in which a gear segment 3 is carried by each movable section of the core and operatively engaged with a pinion 4. This pinion may be mounted upon a shaft 5 upon which is also fixed a worm gear 6, said worm gears being operated by the left and right worms 7 mounted upon a common shaft 8 which may be rotated as by the gearing 9 driven by a reversible motor 10.

The circuit to be controlled may comprise the wires 11 leading from a suitable source of electric power through the coils 12 and then to the current consuming device. These coils may be fixed with relation to each other as illustrated in the drawings.

The separable ends of the core are arranged to be moved toward and from each other through the coil or coils 12 for the purpose of changing the reactive capabilities in the circuit and thus affecting the amount of current flowing to the current consuming device.

With the separable ends of the core in the wide open position, as shown in Fig. 2, the current will flow from the source of power through the coils to the current consuming device, the coils offering a minimum impedance to the flow of current.

As the separable ends of the core are moved closer together a magnetic flux will be set up in the iron core increasing the reactive capability of the control apparatus and thus affecting the amount of current flowing to the current consuming device.

As the separable ends of the core are moved to the closed position, shown in Figure 1, the reactive capability of the apparatus will be increased to such a degree that very little current will flow to the current consuming device.

I claim:

1. A current control apparatus for a current consuming device comprising a coil through which the current flows, and a separable iron core including a stationary portion and movable portions, the open ends of the movable portions being adapted to be moved toward or from the coil and each other and so arranged with reference to the coil that when the open ends of the core are furthest from each other the current will pass directly through the coil without being influenced by the core, and when the ends are in their closest position a magnetic flux will be set up in the iron core causing a change in the reactive capability of the apparatus and in the current flowing to the current consuming device.

2. A current control apparatus for a current consuming device comprising a pair of coils through which the current flows, and a separable iron core including movable portions, the open ends thereof being adapted to be moved toward or from the coils and each other and so arranged with reference to the coils that when the open ends of the core are farthest from each other the current will pass directly through the coils without being influenced by the core, and when the ends are in their closest position a magnetic flux will be set up in the iron core causing a change in the reactive capability of the apparatus and in the current flowing to the current consuming device.

In testimony that I claim the above, I have hereunto subscribed my name.

PETER M. NAGY.